United States Patent [19]

Barclay et al.

[11] E Re. 31,508

[45] Reissued Jan. 24, 1984

[54] ELECTRODEPOSITION OF CHROMIUM

[75] Inventors: Donald J. Barclay, Olivers Battery Hants; William M. Morgan, Chandlers Ford Hants, both of England

[73] Assignee: International Business Machines Corporation, Armonk, N.Y.

[21] Appl. No.: 371,918

[22] Filed: Apr. 26, 1982

Related U.S. Patent Documents

Reissue of:

[64] Patent No.: 4,062,737
Issued: Dec. 13, 1977
Appl. No.: 637,483
Filed: Dec. 3, 1975

U.S. Applications:

[63] Continuation of Ser. No. 97,572, Nov. 26, 1979, abandoned.

[30] Foreign Application Priority Data

Dec. 11, 1974 [GB] United Kingdom ..... 53642/74

[51] Int. Cl.[3] ..... C25D 3/06; C25D 3/56

[52] U.S. Cl. ..... 204/43 R; 204/51

[58] Field of Search ..... 204/43 R, 51, 43 T; 423/366

[56] References Cited

U.S. PATENT DOCUMENTS 2,088,615 8/1937 Schlotter ..... 204/51
2,822,326 2/1958 Safranek ..... 204/43 R

FOREIGN PATENT DOCUMENTS 1258021 12/1971 United Kingdom ..... 204/51

OTHER PUBLICATIONS

Paul Morisset et al., "Chromium Plating," p. 471, (1954).
C. U. Chisholm, Plating, pp. 735–739, Jul. 1968.
D. J. Levy, et al., J. Electrochem. Soc., vol. 118, No. 10, pp. 1563–1570, Oct. 1971.
D. J. Levy, et al., Plating, pp. 1125–1131, Nov. 1970.
Donald J. Barclay, et al., Inorganic Chemistry, vol. 9, No. 5, pp. 1024–1030, (1970).

*Primary Examiner*—G. L. Kaplan
*Attorney, Agent, or Firm*—Francis A. Sirr

[57] ABSTRACT

Chromium containing deposits free of cracks and having good hardness are plated by the use of a novel aqueous chromium (III) electrolyte. The electrolyte includes an aquo chromium (III)-thiocyanato complex as a source of chromium (III) cations.

20 Claims, No Drawings

ELECTRODEPOSITION OF CHROMIUM

Matter enclosed in heavy brackets [ ] appears in the original patent but forms no part of this reissue specification; matter printed in italics indicates the additions made by reissue.

*This is a continuation of application Ser. No. 97,572 filed Nov. 26, 1979, now abandoned.*

FIELD OF THE INVENTION

The present invention relates to the electrodeposition of chromium and its alloys, to the electrolyte utilized in carrying out the method, and to the articles produced by the method.

DESCRIPTION OF THE PRIOR ART

Most chromium electroplating methods utilize hexavalent chromium (VI) cation and sulfate anions as the predominant ingredients in the electrolyte. In most instances chromium trioxide $CrO_3$ is the source of chromium (VI) cation and sulfuric acid is the source of the sulfate anion. Such chromium plating baths are characterized by low plating efficiency. Additionally, such baths emit chromic acid fumes which present a health hazard, unless carefully controlled.

Normally, trivalent chromium is intentionally excluded from chromium plating solutions as experience has shown that it provides a gray, nodular deposit which is undesirable. However, some reports of desirable electrodeposition of chromium from chromium (III) baths has been reported. In an article by D. J. Levy and W. R. Momyer, appearing at pages 1125–1131, November 1970, PLATING, a study of the electrodeposition of chromium from chromium (III) complexes dissolved in non-aqueous organic solvents was reported. Electrolytes including both cationic and anionic chromic complexes in organic amide solvents were utilized. Included among the chromium complexes studied were hexaquochromium (III) ion, $Cr(H_2O)_6^{+3}$ and thiocyanatopentaamminechromium (III) complex, $Cr(NH_3)_5SCN^{+2}$. The use of aqueous plating systems or aquo chromium (III) thiocyanato complexes is not taught or suggested by this reference. A subsequent report on the electrodeposition of chromium from hexaaminechromium (III) formate utilizing ligands, including thiocyanate, for promoting chromium deposition from non-aqueous amide solvents was made by D. J. Levy and W. R. Momyer at pages 1563–1570, October 1971, g. Electrochem, Soc., Vol. 118, No. 10. J. E. Bride reported on a proprietary trivalent chromium plating system at pages 1027–1032, November 1972, PLATING, U. K. Pat. No. 1,144,913 discloses the preparation of chromium from an electrolyte including a non-thiocyanate complex of chromium (III) with dipolar organic compounds and water. U. K. Pat. No. 1,333,714 discloses an aqueous chromium (III) plating bath including an aprotic amido buffer. In this reference thiocyanate is not associated with the system. Of some additional interest is the article by F. Taylor, at pages 53–56, July 1952, METAL FINISHING, which discloses a chromium plating bath utilizing primarily chromium (VI), but including small amounts of chromium (III). U. K. Pat. No. 1,258,021 is of interest as disclosing a chromium (VI) plating bath including thiocyanic acid or its salts as a promoting agent in the electrolyte. None of the references noted utilizes an aquo chromium (III)-thiocyanato complex in an aqueous electrolyte solution.

SUMMARY OF THE INVENTION

According to the present invention, there is provided an aqueous chromium or chromium alloy producing electrolyte in which the source of chromium (III) cation comprises an aquo chromium (III)-thiocyanato complex. The present invention also provides a process of electrodepositing chromium or chromium containing alloys comprising passing an electroplating current between an anode and a cathode in an aqueous plating solution having a source of chromium (III) cation comprising an aquo chromium (III)-thiocyanato complex.

The complexes utilized in the present invention are aquo chromium (III) thiocyanato complexes, also referred to as aquo thiocyanatochromate (III) complexes. These complexes are of the general formula:

$$(H_2O)_{6-n}Cr(SCN)_n^{(+3-n)}$$

where n is a whole number from 1 through 6. Of course, as already indicated, chromium in these complexes is of the chromium (III) variety.

A brief study of this formula will make it apparent that depending on what number "n" is, the complex may be cationic, neutral or anionic. Complexes having charges of +2, +1, neutral, −1, −2, and −3 may be variously provided. Complexes of this type are described in INORGANIC CHEMISTRY 9, 1028 (1970). In fact, it may be possible that each of these complexes is present in the electrolyte in an equilibrium mixture. One convenient method of preparing these complexes is from chromium perchlorate and sodium thiocyanate, as described in more detail below.

While, not known with certainty, the following mechanism for the plating process is postulated. A cation, such as sodium, is present in the solution from the disassociation of, for example, the original thiocyanate salt in the formation of the complex, as described in more detail below. It is believed that these cations provide the primary means of carrying current in the solution. Tiocyanate serves as a bridging ligand in the complex. Therefore, complexes containing thiocyanate, and incidentally, also carrying chromium (III) are readily absorbed onto the conductive substrate of the cathode. Once present at the cathode the chromium (III) is reduced by available electrons and deposited as chromium metal. At the same time, the sodium or other cations carrying plating current are not reduced to form a metallic deposit. As the aquothiocyanatochromate (III) complexes are variously cationic, neutral or anionic it is believed that the complexes are transported to the cathode by diffusion as well as by the action of the plating field on the complexes which are cationic. Consequently, chromium is deposited not only from the cationic complexes but also from the anionic and neutral complexes present at the cathode due to diffusion.

It has been noted that during deposition substantially all of the thiocyanate anion is liberated to the solution from the complex, although a small amount of thiocyanate may be codeposited with the electrodeposited metal.

The foregoing and other objects, features, and advantages of the invention will be apparent from the following more particular description of preferred embodiments of the invention.

DESCRIPTION OF THE PREFERRED EMBODIMENTS

The present invention can be practiced under a broad range of plating conditions including substantial variations in electrolyte composition. Suitable plating conditions and compositions include, about:

Chromium ($Cr^{+3}$); 0.03–0.5 M
Thiocyanate (SCN)−0.05–1.0 M
Boric acid ($H_3BO_3$); 50 g/l (saturated)
Current density of cathode surface 20–120 mA/cm$^2$
Cell voltage; 7–15 volts
Temperature; 20°–25° C.
pH; 2–3.5

The solvent of choice is water. In each of the following examples the chromium (III) cation was provided from chromium perchlorate $Cr(ClO_4)_3$ although other sources of trivalent chromium may be utilized. Similarly sodium thiocyanate NaSCN was utilized as a source of thiocyanate anion due to its availability and high solubility. However, other sources of thiocyanate can be utilized. While a specific amount of boric acid $H_3BO_3$ has been indicated, any amount of boric acid which provides a saturated solution can be utilized. The experiments from which the above ranges were derived generally employed constant current conditions. However, in some instances the potential of the cathode was kept constant relative to a standard calomel electrode arranged to sample the solution in the vicinity of the cathode, thus providing potentiostatic conditions.

The plating apparatus in which the previously noted experiments were conducted included a platinized titanium anode. While not required for a single or short run, it was found to be necessary for long term operations of the bath to isolate this anode by means of a semi-permeable barrier, in a sodium perchlorate anolyte solution. In the absence of such isolation the pH of the electrolyte falls away steadily. It is then found that when the pH value falls below 1.5 plating ceases. In the following examples chromium and its alloys were plated onto a brass cathode in a Hull cell in some instances, while in other instances it was plated onto copper or metalized glass cathodes in different plating cell arrangements. Chromium and chromium alloys of up to 0.001 inch (0.025 mm) thick was deposited utilizing these techniques.

The chromium and chromium alloys plated by the process of the present invention are substantially free of impurities, although detection of sulfur in the deposits indicates that a small amount of thiocyanate may have been codeposited with the metal. The effects of such codeposition may actually be beneficial as providing sites for stress reduction in the deposit. In each instance the deposited chromium was observed to be bright and was found to be relatively hard, exhibiting a Vickers Hardness No. (VHN) of 700. The deposits were uncracked, and had excellent corrosion resistance.

In each instance the electrolyte exhibited good throwing power for the current and, as previously indicated operated over a wide range of conditions with good current efficiency.

In addition to pure chromium plating, solutions containing aquo thiocyanato chromate (III) complexes have been used to plate alloys of chromium. In particular, alloys of cobalt and chromium have been plated from a solution containing cobalt cations, while alloys of nickel and chromium have been plated from solutions containing nickel cation.

The invention will now be more particularly described with reference to the following examples of preferred plating solutions and processes carried out in accordance with the present invention.

EXAMPLE I

Preparation of a plating solution according to the invention comprised the initial step of preparing a solution of chromium perchlorate $Cr(ClO_4)_3$ in water. This solution was prepared by adding 150 grams of sodium dichromate $Na_2Cr_2O_7$ to 485 ml of perchloric acid $HClO_4$ and 525 ml of water. Hydrogen peroxide $H_2O_2$ was added in dropwise fashion until the solution became deep blue color. When this state was reached the solution was boiled down to half its volume driving off hydrogen peroxide and leaving the required solution of chromium perchlorate. This solution was then diluted to 0.15 M concentration to provide a source of trivalent chromium for plating.

To prepare the plating electrolyte, 150 ml of the diluted 0.15 M chromium perchlorate solutions was saturated with boric acid $H_3BO_3$. Then solution hydroxide NaOH was added in dropwise fashion to adjust the pH of the solution within the range of 1–2. Two grams of sodium thiocyanate NaSCN were added to the solution and the resultant mixture was subsequently heated at 80° C. for 1 hour to produce a plating electrolyte comprising an equilibrium mixture of aquo chromium (III) thiocyanato complexes. The chromium in the chromium perchlorate solution is hydrated, and in the form of $Cr(H_2O)_6^{-3}$. The equilibrium mixture of aquo chromium (III) thiocyanato complexes is produced by the progressive replacement of the $H_2O$ groups in the hydrated chromium with SCN-groups.

Following the adjustment of the pH of the solution to 2.5 using NaOH, the concentration of the various constituents of this plating solution is about as follows:

Cr(III); 0.1 M
$NCS^-$; 0.2 M
$H_3BO_3$; 50 g/l
$Na^+$; 2 M
$ClO_4^-$; 0.5 M

A plating process according to the present invention and employing above plating solution was carried out as follows.

The plating solution was introduced into a plating cell having a platinized titanium anode and a flat surfaced brass cathode having an area of about 38 cm$^2$. The anode was isolated from the plating solution proper by a cationic selective ion exchange membrane or barrier and was surrounded by an anolyte of sodium perchlorate at 0.5 M concentration. The pH of the anolyte was 2.

A plating current of density 25 mA/cm$^2$ of the cathode surface was passed between the anode and the cathode for a time of 15 minutes. The plating current was kept constant throughout this time. The temperature of the solution during plating was 20° C. A total weight of 0.021 g of chromium was found to be deposited.

The deposited chromium appeared bright to the eye and uncracked when examined under a microscope. Its hardness was measured to be 700 VHN. Its resistance to corrosion in a high humidity, high sulfur dioxide atmosphere was excellent.

EXAMPLE II

An alloy of cobalt and chromium was plated onto a copper cathode in a cell similar to that employed in Example I. The plating solution had the following composition:

$CoSO_4.7H_2O$; 0.025 M
Cr(III); 0.1 M
$NCS^-$; 0.2 M
$H_3BO_3$; 50 g/l
$Na^+$; 2 M
$ClO_4^-$; 0.5 M

Plating was carried out under constant current conditions and a current density of 150 mA/cm$^2$ of the cathode surface was employed for a time of 2 minutes. The solution temperature was 20° C. during plating. A weight of 3 mg of cobalt-chromium alloy was deposited. The composition of the alloy was about 20 (At)% Co-80 (At)% Cr. This alloy was found to be magnetic with a coercivity of 30 Oe. Corrosion resistance as measured electrochemically was excellent.

EXAMPLE III

An alloy of nickel and chromium was also plated onto a cathode in a cell similar to that employed in Example I. The plating solution had the following composition:

$NiSO_4.6H_2O$; 0.25 M
Cr (III); 0.1 M
$NCS^-$; 0.2 M
$H_3BO_3$; 50 g/l
$Na^+$; 2 M
$ClO_4^-$; 0.5 M

Plating was carried out under constant current conditions at a current density of 150 mA/cm$^2$. The solution temperature was 20° C. during plating. The plating current was applied for a time of 2 Minutes. The resulting nickel-chromium deposit was observed to be magnetic.

While the invention has been particularly shown and described with reference to preferred embodiments thereof, it will be understood by those skilled in the art that various changes in form and details may be made therein without departing from the spirit and scope of the invention.

What is claimed is:

1. A composition of matter for use in the electrodeposition of *bright* chromium containing deposits consisting essentially of an aqueous solution of aquo chromium (III) thiocyanato [complex] *complexes* as a source of trivalent chromium, the concentration of [the] Cr (III) *in the solution* being in the range of 0.03 to 0.5 M, *and the thiocyanate concentration in the solution being in the range of 0.05 to 1.0 M, wherein the concentration of thiocyanate is higher than the concentration of Cr (III), and wherein the aquo chromium (III) thiocyanato complexes are an equilibrium mixture of complexes of the formula*

$$(H_2O)_{6-n}Cr(SCN)_n^{(+3-n)}$$

*where n is a range of whole numbers from 1 through 6.*

[2. The composition of claim 1 wherein the aquo chromium (III) thiocyanato complex is an equilibrium mixture of complexes having the formula $$(H_2O)_{6-n}Cr(SCN)_n^{(+3-n)}$$

where n is a whole number from 1 through 6.]

3. The composition of claim [2] *1 or 26* in which the complexes are prepared by the process of reacting thiocyanate anion with chromium perchlorate.

4. The composition of matter of claim 1 *or 26* for plating cobalt-chromium containing alloys in which cobalt cations are present in said aqueous plating solution.

5. The composition of matter of claim 1 *or 26* for plating nickel-chromium containing alloys in which nickel cations are present in said aqueous plating solution.

[6. The composition of claim 1 in which the thiocyanate concentration is in the range of 0.05 to 1.0 M.]

7. The composition of claim [6] *1 or 26* in which the pH of the Aqueous solution is in the range of about 2 to 3.5 [and], the solution is saturated with boric acid. , *and the thiocyanate-to-Cr (III) concentrations are in about a 2-to-1 ratio.*

8. A method of electrodepositing *bright* chromium containing material on a cathode, which comprises passing an electroplating current between an *insoluble* anode and said cathode in a Plating solution consisting essentially of an aqueous solution of [an] aquo chromium (III) thiocyanato [complex] *complexes* as a source of trivalent chromium, *said solution being prepared by means of time and temperature equilibration in which the thiocyanate is substituted into the chromium complexes, and in which chromium (III) concentration in the solution is in the range of 0.03 to 0.5 M and the thiocyanate concentration in the solution is in the range of 0.05 to 1.0 M, the concentration of thiocyanate being higher than the concentration of chromium (III).*

9. The method of claim 8 *or 28* wherein the aquo chromium (III) thiocyanato complex is an equilibrium mixture of complexes having the formula $$(H_2O)_{6-n}Cr(SCN)_n^{(+3-n)}$$

where n is a *range of* whole [number] *numbers* from 1 through 6.

10. The method of claim [9] *8 or 28* in which complexes are *an equilibrium mixture of complexes having the formula*

$$(H_2O)_{6-n}Cr(SCN)_n^{(+3-n)}$$

*where n is a range of whole numbers from 1 through 6,* prepared by the process of reacting thiocyanate anion with chromium perchlorate.

11. The method of claim 8 *or 28* for plating cobalt-chromium containing alloys in which cobalt cations are present in said aqueous plating solution.

12. The method of claim 8 *or 28* for plating nickel-chromium alloys in which nickel cations are present in said aqueous plating solution.

[13. The method of claim 8 in which the chromium (III) concentration is in the range of 0.03 to 0.5 M and in which the thiocyanate concentrations is in the range of 0.05 to 1.0 M.]

14. The method of claim [13] *8 or 28* in which the pH of the aqueous solution is in the range of about 2 to 3.5 and the solution is saturated with boric acid.

15. The method of claim [14] *8 or 26* in which *the pH of the aqueous solution is in the range of about 2 to 3.5, the solution is saturated with boric acid,* the electroplating current density is in the range of about 20 to 120 mA/cm$^2$ of the cathode surface, *the thiocyanate-to-chromium (III) concentration ratio is about 2-to-1, and the deposited chromium containing material is of about a Vicker Hardness number 700.*

16. The method of claim 8 *or 26* in which the electroplating current density is in the range of about 20 to 120 $mA/cm^2$ of the cathode surface.

17. The method of claim 8 *or 28* in which the anode is immersed in an anolyte and said anode and anolyte are separated from the plating solution by an ion exchange barrier.

18. The process of claim [17] *8 or 26 in which the anode is immersed in an anolyte and said anode and anolyte are separated from the plating solution by an ion exchange barrier, and* in which the anolyte is sodium perchlorate.

19. The method of preparing a plating solution for electroplating of *bright* chromium comprising the step of reacting a thiocyanate anion with chromium perchlorate in the presence of boric acid in an aqueous solution having a pH of 1 to 2 to form an aquo chromium III thiocyanato complex of the formula $(H_2O)_{6-n}Cr(SCN)_n^{(+3-n)}$, *in* which n is a *range of* whole [number] *numbers* from one through six, *wherein the chromium in the perchlorate solution is hydrated in the form of* $Cr1H_2O)_6{}^{+3}$, *and wherein the cyanato complex is formed by the progressive replacement of the* $H_2O$ *groups, said replacement being produced by heating said solution for one hour at 80° C., the thiocyanate concentration being in the range of about 0.05 to 1.0 M, and the chromium III concentration being in the range of about 0.03 to 0.5 M, and the concentration of thiocyanate being higher than the concentration of chromium III.*

20. The invention as defined in claim 19 wherein the source of thiocyanate anion is sodium thiocyanate, *and wherein the concentration ratio of thiocyanate to chromium III is about 2 to 1.*

[21. The invention as defined in claim 19 wherein the chromium in the perchlorate solution is hydrated in the form of $Cr(H_2O_6)^{-3}$.]

[22. The invention as defined in claim 21 wherein the cyanato complex is formed by the progressive replacement of the $H_2O$ groups.]

[23. The invention as defined in claim 19 wherein the reaction takes place at an elevated temperature.]

24. The invention as defined in claim 19 wherein the reaction solution contains sodium hydroxide to control the pH.

*25. The composition of claim 1 wherein said equilibrium is produced by heating said composition of matter for one hour at 80° C.*

*26. The method of claim 8 wherein said equilibration is produced by heating said solution for one hour at 80° C.*

* * * * *

UNITED STATES PATENT AND TRADEMARK OFFICE

CERTIFICATE OF CORRECTION

PATENT NO. : Re 31,508

DATED : Jan. 24, 1984

INVENTOR(S) : Donald J. Barclay and William M. Morgan

It is certified that error appears in the above—identified patent and that said Letters Patent is hereby corrected as shown below:

Column 2, line 44, "Tiocyanate" should read --Thiocyanate--.

Column 3, line 9, after "(SCN)-" insert --;--.

Column 4, line 22, "solution" should be --sodium--.

Column 6, claim 7, line 12, "Aqueous" should be --aqueous--;

claim 13, line 56, "concentrations" should be --concentration--.

Column 7, claim 19, line 22, in the formula, "Crl" should be --Cr(--.

Signed and Sealed this

*Thirty-first* Day of *July 1984*

[SEAL]

*Attest:*

GERALD J. MOSSINGHOFF

*Attesting Officer*

*Commissioner of Patents and Trademarks*